United States Patent
Yearsley et al.

(10) Patent No.: US 6,915,414 B2
(45) Date of Patent: Jul. 5, 2005

(54) CONTEXT SWITCHING PIPELINED MICROPROCESSOR

(75) Inventors: Gyle D. Yearsley, Boise, ID (US); William J. Tiffany, Boise, ID (US); Lloyd A. Hasley, Austin, TX (US)

(73) Assignee: ZiLOG, Inc., San Jose, CA (US)

( * ) Notice: Subject to any disclaimer, the term of this patent is extended or adjusted under 35 U.S.C. 154(b) by 608 days.

(21) Appl. No.: 09/909,507

(22) Filed: Jul. 20, 2001

(65) Prior Publication Data

US 2005/0005088 A1 Jan. 6, 2005

(51) Int. Cl.[7] .............................. G06F 9/38; G06F 9/52; G06F 9/54
(52) U.S. Cl. ...................... 712/219; 712/228; 713/323; 713/401; 710/117; 709/108
(58) Field of Search ................................. 712/219, 228, 712/207, 247, 229; 718/108; 713/323, 401, 601; 710/117; 709/108

(56) References Cited

U.S. PATENT DOCUMENTS

| | | | | |
|---|---|---|---|---|
| 5,390,332 A | * | 2/1995 | Golson ........................ | 710/269 |
| 5,490,265 A | * | 2/1996 | Riches et al. ................ | 711/169 |
| 5,594,903 A | * | 1/1997 | Bunnell et al. .............. | 717/162 |
| 6,205,468 B1 | * | 3/2001 | Diepstraten et al. ......... | 718/108 |
| 6,324,594 B1 | * | 11/2001 | Ellis et al. ...................... | 710/5 |
| 6,341,347 B1 | * | 1/2002 | Joy et al. ...................... | 712/228 |
| 6,553,513 B1 | * | 4/2003 | Swoboda et al. .............. | 714/28 |

OTHER PUBLICATIONS

Zilog Technical Manual, Z80 CPU Central Processing Unit, Sep. 1998, pp. 1–22, 81–104.

Motorola Inc., MPC860 PowerQUICC User's Manual, MPC860UM/AD, Jul. 1998, Rev. 1, pp. 1–i to 1–iv, 1–1 to 1–10, 4–1 to 4–18, 5–1 to 5–12, 6–1 to 6–24.

* cited by examiner

*Primary Examiner*—Daniel H. Pan
(74) *Attorney, Agent, or Firm*—Parsons Hsue & de Runtz LLP

(57) ABSTRACT

A single shared processing path is used as contexts are switched during processing. Each unique context is processed using a corresponding unique pipeline. If a pipeline that is executing under one context stalls, processing is switched in the shared processing path to another pipeline that is executing under second context. New pipelines are enabled for execution by borrowing a clock cycle from the currently executing pipeline. In some cases contexts are assigned various relative priority levels. In one case a context switching microprocessor is used in a communication engine portion of a system-on-a-chip communication system.

25 Claims, 6 Drawing Sheets

| Destination Address | | | Source Address | | |
|---|---|---|---|---|---|
| Register | IW[23:20] | Register Name | Register | IW[19:16] | Register Name |
| R0 | 0000 | GP Register 0 | R0 | 0000 | GP Register 0 |
| R1 | 0001 | GP Register 1 | R1 | 0001 | GP Register 1 |
| R2 | 0010 | GP Register 2 | R2 | 0010 | GP Register 2 |
| R3 | 0011 | GP Register 3 | R3 | 0011 | GP Register 3 |
| R4 | 0100 | GP Register 4 | R4 | 0100 | GP Register 4 |
| R5 | 0101 | GP Register 5 | R5 | 0101 | GP Register 5 |
| R6 | 0110 | GP Register 6 | R6 | 0110 | GP Register 6 |
| R7 | 0111 | GP Register 7 | R7 | 0111 | GP Register 7 |
| R8 | 1000 | Reserved | R8 | 1000 | Reserved |
| R9 | 1001 | Reserved | R9 | 1001 | Reserved |
| R10 | 1010 | PipeLine | R10 | 1010 | PipeLine |
| R11 | 1011 | Stack Pointer | R11 | 1011 | Stack Pointer |
| R12 | 1100 | Command | R12 | 1100 | Command |
| R13 | 1101 | CRC Data/ Addr Compression Data | R13 | 1101 | CRC Data/ Addr Compression Data |
| R14 | 1110 | CRC Remainder Data | R14 | 1110 | CRC Remainder Data |
| R15 | 1111 | CRC Polynomial Addr Compression Mask | IMM | 1111 | Immediate Data |

FIG. 5

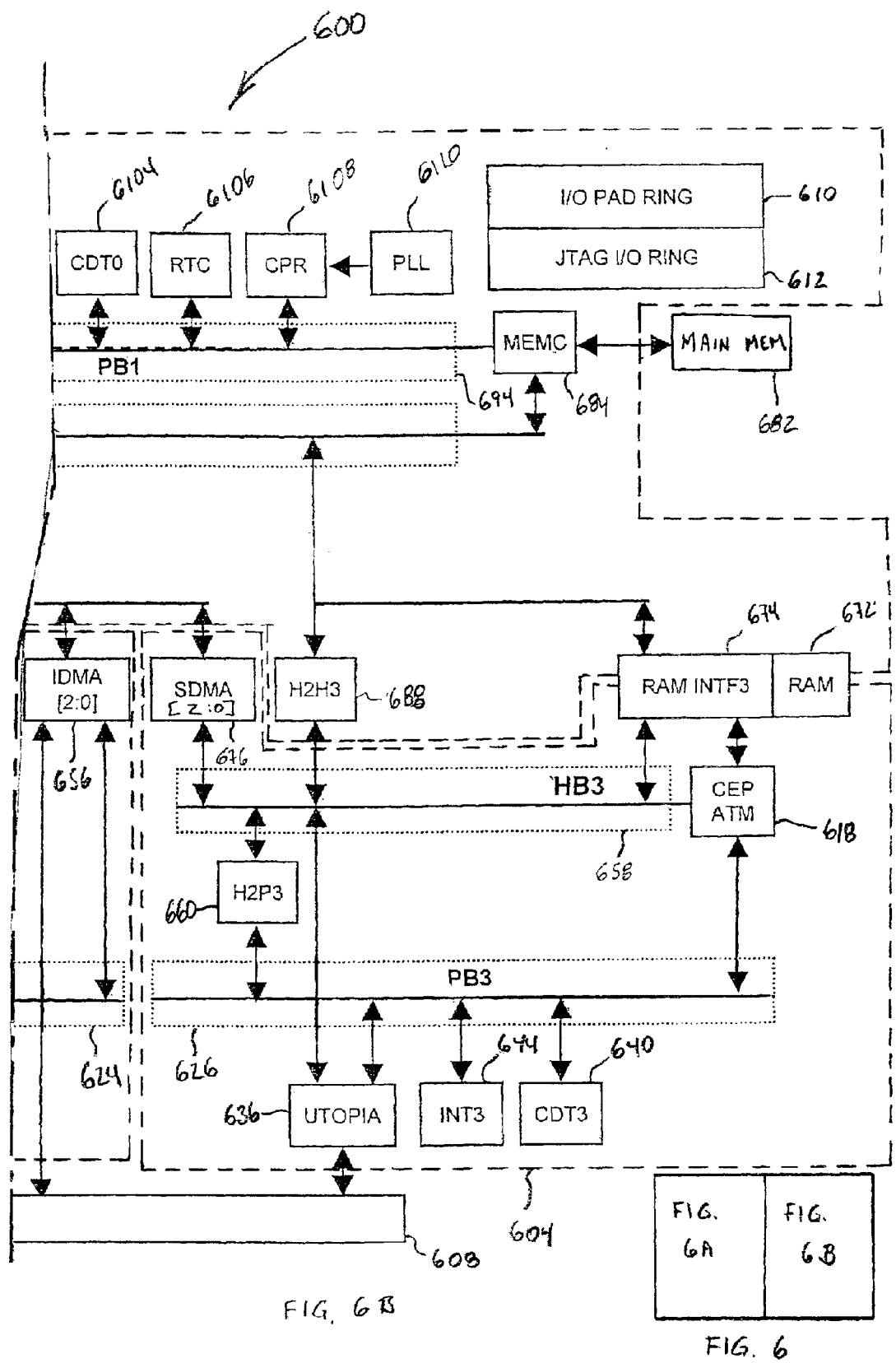

CONTEXT SWITCHING PIPELINED MICROPROCESSOR

BACKGROUND

1. Field of Invention

The invention relates to processing multiple contexts, and more particularly to a microprocessor using shared pipeline stages to facilitate context switching during processing.

2. Related Art

Electronic processors that execute arithmetic and logical operations (e.g., integrated circuit microprocessors) typically execute a predefined process (a program) in order to complete a particular task. Since such processors are typically assigned many tasks, they execute many corresponding processes to carry out assigned tasks. Pipelining is a well-known method of simultaneously, or nearly simultaneously, executing instructions associated with two or more of such processes. The pipeline moves the data associated with the process through the processor as the processor executes the process. For example, the pipeline may be thought of as the instruction data that moves through the processor as the processor carries out the process. The context under which the processor is operating as it executes a particular pipelined process is the information that is associated with the process being executed by the particular pipeline. During execution of the pipelined process, multiple registers typically store context information associated with the execution. This context information may be, for example, address information, data, a program counter, a stack pointer, and flags (e.g., carry flag). Thus registers store context information that is associated with the pipelined process being executed.

System-on-a-chip (SOC) designs implement an entire electronic system on one integrated circuit chip. SOCs typically include at least one embedded microprocessor and other circuits required to implement the system. Microprocessors that can execute two or more pipelines are known. Typically in such microprocessors, a unique set of registers is associated with each unique pipeline, and each unique register set stores context information that is associated with each unique pipeline. Such registers require on-chip area. As SOC designs become more complex, however, chip area becomes an important design limitation. Therefore, what is required is a way to facilitate the use of multiple pipelines in a microprocessor topology while simultaneously saving chip area.

SUMMARY

A shared pipeline instruction datapath and a shared pipeline processing unit are used to switch among several contexts. For example, when a microprocessor is executing a first pipeline under a first context, the microprocessor receives a request to execute under a second context. A clock cycle is borrowed from the first pipeline execution and is used to enable (e.g., prefetch an address vector) a second pipeline that corresponds to the second context. When the first pipeline stalls, the processor begins to execute the second pipeline without delay, since the second pipeline has been enabled while the first pipeline is executing.

In one case the shared instruction datapath and shared processing unit combination (shared processing path) comprise address, fetch, memory, decode, and execution pipeline stages. Context information (e.g., program counter; stack pointer, flags) for each of up to three pipelines is stored in three corresponding sets of registers, one set for each context. To switch contexts, the shared datapath and processing unit combination stop accessing the program counter and other context information for the stalled pipeline context and begin accessing the program counter and context information for the new pipeline context so that execution of the new pipeline can proceed. When a context switch occurs and a pipeline is no longer being executed, context information for that pipeline is preserved in the register sets. Therefore, when another context switch occurs and the pipeline is once again being executed, the required context information is available to the shared processing path. In one case, some registers in the shared processing unit are shared for processing each unique context. For example, in one case registers in the processing unit that are used for cyclic redundancy checking (CRC) are shared. When a context switch occurs, CRC information for a stalled pipeline is flushed from the shared registers, and new CRC information is loaded in the shared registers as the new pipeline executes.

BRIEF DESCRIPTION OF THE DRAWINGS

FIG. 5 is a diagram illustrating register definitions.

FIG. 6, partitioned into FIGS. 6A and 6B, is a diagrammatic view of an integrated circuit.

DETAILED DESCRIPTION

Skilled artisans will understand that details have been omitted from the following description so as to more clearly describe embodiments. Embodiments are described in terms of a reduced instruction set computer (RISC) processor acting, for example, as a communication engine processor. Knowledgeable persons will understand, however, that such embodiments are easily adapted to apply to all microprocessor architectures, e.g., complex instruction set architectures, and to other electronic processors. Embodiments are described using three pipelines-labeled pipeline 0, pipeline 1, and pipeline 2. This number of pipelines is illustrative, and other embodiments share other numbers of pipelines.

Figure 1:
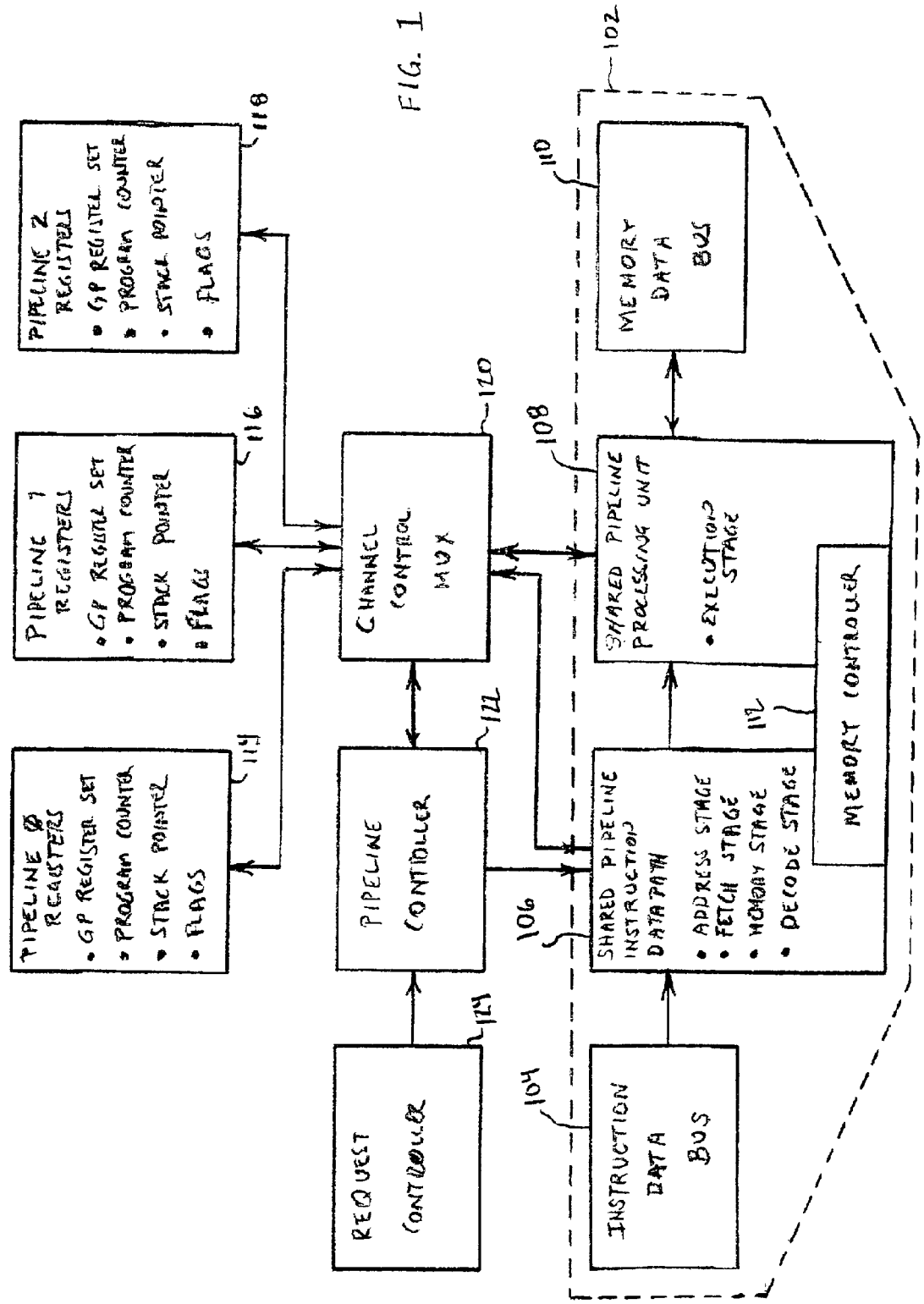
FIG. 1 is a diagrammatic view of a context switching processor embodiment.

FIG. 1 is a diagrammatic view illustrating functional blocks in a context switching microprocessor embodiment. The functional blocks bounded by dashed line 102 represent the microprocessor's shared processing path. As shown in FIG. 1, the shared processing path 102 includes five pipeline stages: address stage, fetch stage, memory stage, decode stage, and execution stage.

The address stage outputs to the instruction memory (not shown) an address for an instruction to be fetched for processing a particular context. The fetch stage receives the fetched instruction (e.g., after waiting for at least one clock cycle on a high speed bus). The memory stage sets up additional memory addresses based on the fetched instruction, depending if data is to be retrieved from or pushed to a memory external to processing path 102. In some cases the memory stage must wait to generate the required addresses. If, for example, particular information has not yet been written to an address location from which the information is to be read, the memory stage stalls until the information is available to be read. The decode stage decodes, for example, which pipeline registers are to be used for the next operation and decodes instruction information. The execution stage executes instructions.

For a particular context being processed, the conventionally fetched instructions from an instruction storage location (not shown; e.g., conventional random access memory (RAM)) are placed on conventional instruction data bus 104. Shared pipeline instruction datapath 106 then carries out the fetch, memory, and decode pipeline stages. Shared pipeline processing unit 108 processes (e.g., performs arithmetic and logical operations) context information as the pipeline execution stage. Processing unit 108 reads and writes information from another conventional storage location (not shown) via conventional data bus 110. Memory controller 112 controls memory access (e.g., addressing) for all five pipeline stages in datapath 106 and processing unit 108.

As depicted in FIG. 1, registers 114, 116, 118 are each associated with three unique processing pipelines, identified as pipeline 0, pipeline 1, and pipeline 2, respectively. The three unique pipelines process three corresponding unique contexts. That is, pipeline 0 processes under a first context, pipeline 1 under a second context, and pipeline 2 under a third context. Each of registers 114, 116, 118 include registers for information associated with each corresponding context. Only one pipeline is executed at a time, and so the register 114 information is used as pipeline 0 executes, register 116 information is used as pipeline 1 executes, and register 118 information is used as pipeline 2 executes. The number of shared pipelines and the number of registers storing information associated with each context is illustrative. In one case the register set in each pipeline register 114, 116, 118 is a 16×32 bit register set. Other register set configurations are used in other cases.

In one case, each register set 114, 116, 118 includes a program counter register, a stack pointer register, a flag register, and one or more additional general purpose register sets used for information (e.g., instructions, addresses, data) associated with the pipeline's context. The stored program counter points to the next instruction to be fetched for the particular pipeline. The stored stack pointer points to a memory location used to store an intermediate value (e.g., a "scratch pad" location) during processing of the particular pipeline. The flag register contains conventional flag information (e.g., carry flag) associated with the particular pipeline.

In one case, the program counter, stack pointer, and flag register assignments are shared among the three pipelines. For example, if pipeline 0 is executing, then a pipeline 0 program counter register stores a program counter associated with the pipeline 0 context. If pipeline 1 is executing, then the pipeline 1 program counter register stores a program counter associated with the pipeline 1 context. When a switch from processing the pipeline 0 context to the pipeline 1 context occurs, processing unit 108 stops accessing the pipeline 0 program counter register contents and starts accessing the pipeline 1 program counter register contents. In one case the processor includes a single stack which is, for example, a 128 word area. Each context is associated with a unique 32 word area of the stack. A single, shared stack pointer register contains a stack pointer that points to a location in the stack, and if a context is switched a portion (e.g., 5 bits) is changed in the stack pointer so that the stack pointer now points to the stack area associated with the new context. Another portion of the stack pointer (e.g., 7 bits) points to the stack location within the context's stack area. In other cases other dedicated and shared register assignments are used. For example, in one case registers 114, 116, 118 are all general purpose registers and are not shared among pipelines.

Registers 114, 116, 118 are coupled to shared pipeline instruction datapath 106 and shared pipeline processing unit 108 via channel control multiplexer 120. When processing path 102 switches from processing one context to processing a new context, the necessary new context information from one of the registers 114, 116, 118 is directed to instruction datapath 106 and processing unit 108 via multiplexer 120.

Pipeline controller 122 is electrically coupled to multiplexer 120, shared datapath 106, and request controller 124. Requests from peripherals (not shown) are received by request controller 124 which, in turn, forwards processing requests to pipeline controller 122. Pipeline controller 122 subsequently sets up a pipeline to process the requested task, or if no pipeline is available, queues the request until a pipeline becomes available. Once pipeline processing is being carried out, pipeline controller 122 controls context switching as described below. When processing for one pipeline is halted (e.g., pipeline 0), the information remains in the associated register (e.g., register 114) and is flushed from shared instruction datapath 106 and shared processing unit 108. When processing of the next pipeline begins (e.g., pipeline 1), the information in the next pipeline's associated register (e.g., register 116) is loaded into shared instruction datapath 106 and shared processing unit 108. The decisions to halt a particular pipeline and to begin processing another pipeline are made in pipeline controller 122. These decisions are described in more detail below.

Figure 2:
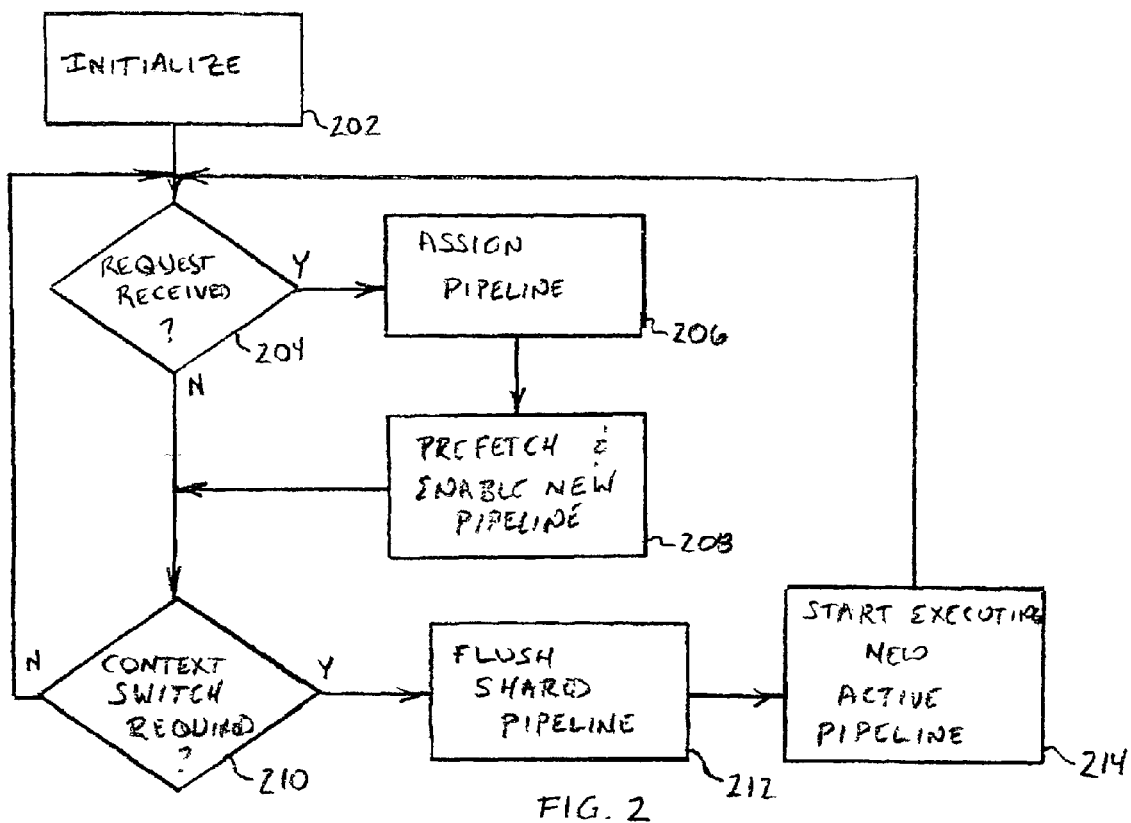
FIG. 2 is a flow diagram illustrating a context switching embodiment.

FIG. 2 is a process flow diagram illustrating a context switching decision tree executed by, for example, a microprocessor acting as a communication engine processor. In 202 the microprocessor is initialized by a reset. In one case pipeline 0 is used to start the reset thread.

In 204 the microprocessor determines (e.g., by sampling) if a processing request has been received from a peripheral component (e.g., serial communication controller). If in 204 a processing request is received, then in 206 the request is assigned to an available pipeline. In one case the request is assigned to pipeline 0 if available, to pipeline 1 if pipeline 0 is unavailable, or to pipeline 2 if pipelines 0 and 1 are unavailable. Other pipeline assignment schedules may be used. Pipeline assignment differs from context switching priority described below.

In 208 a vector associated with the request received in 204 is fetched from instruction memory. The fetched vector is used to load the program counter and other registers for the assigned pipeline (e.g., pipeline 0). This loading enables the pipeline associated with the received request to be started. The pipeline assignment and fetch occurs even if another pipeline is currently executing. A single fetch cycle is borrowed from the executing pipeline, and the borrowed fetch cycle is used to fetch the information required to start the pipeline for the newly received request. Once the starting information is loaded and the pipeline is ready to be executed it is designated as an enabled (ready for execution) pipeline by setting an "enabled" bit in a pipeline register associated with the pipeline (see e.g., FIG. 5, register R10). Borrowing a clock cycle from the executing pipeline to pre-enable a new pipeline prevents delay when processing is switched from one context to another context. Processing under the new context can begin immediately, rather than waiting for the new pipeline to load. If in 204 a request is received after all three pipelines have been enabled, then the request is queued until one of the pipelines becomes available.

After a pipeline for a newly received request is enabled in 208, or if a new request was not received in 204, then in 210 it is determined if a context switch is required. If a context switch is not required, the process moves again to 204. If a context switch is required, however, then in 212 registers in shared instruction datapath 106 and shared processing unit 108 (FIG. 1) are flushed of context information associated with the current active pipeline (e.g., pipeline 0), and the information fetched in 208 is used to load new pipeline (e.g., pipeline 1) context information into shared datapath 106 and processing unit 108. In 214 the new pipeline is designated as the active pipeline by setting an "active" bit in a pipeline register associated with the pipeline. After the new pipeline begins to execute in 214, the process moves to 204 and repeats.

Figure 3:
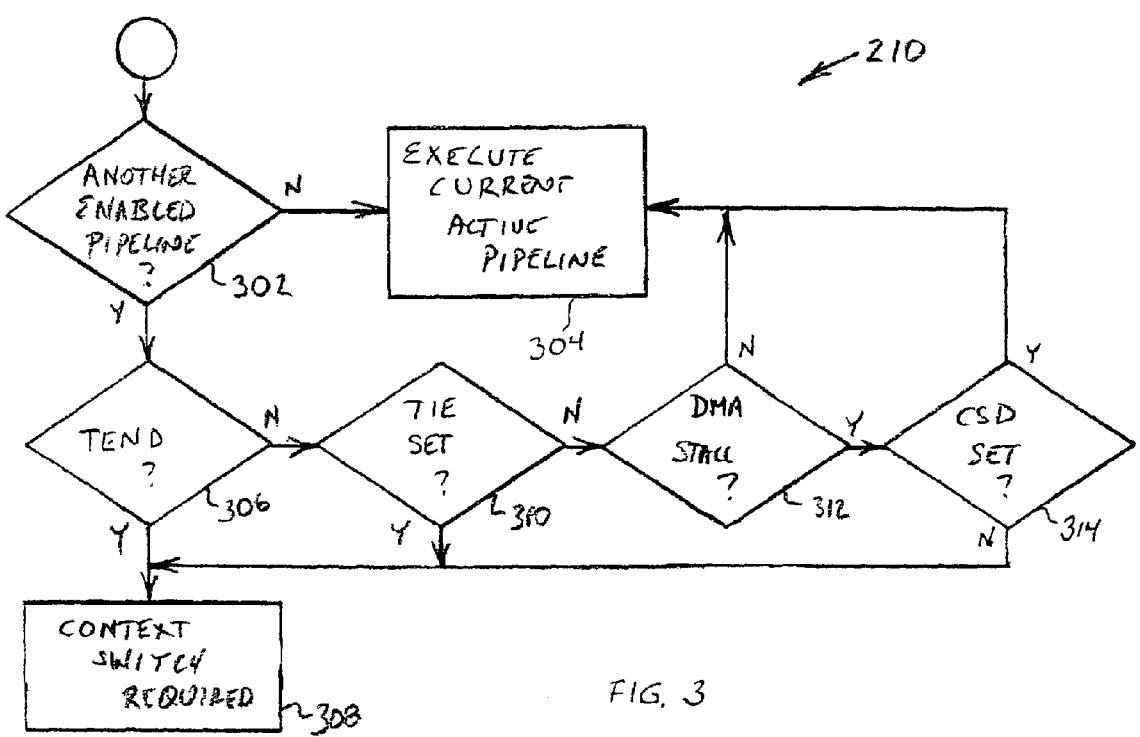
FIG. 3 is a flow diagram illustrating a portion of FIG. 2 in more detail.

FIG. 3 is an illustration of the block 210 (FIG. 2) decision tree. As the currently active pipeline is being executed, in 302 it is determined if another pipeline has been enabled. If another pipeline has not been enabled, then in 304 the current active pipeline execution continues. If another enabled pipeline exists, then it is determined if a context switch is required.

In one case, context switching occurs if one of three conditions exists. First, a context switch will occur if the current active pipeline execution stops because the pipeline thread ends. Second, a context switch will occur if the current active pipeline is a lower priority than another enabled pipeline. Third, a context switch will occur if the current active pipeline execution stops because a direct memory access (DMA) stall exists. These three context switch conditions are illustrative, and context switching may be based on other states such as any pipeline stall. In one case, context switching follows a round-robin schedule, with the context switching from pipeline 0 to pipeline 1, then to pipeline 2, and returning again to pipeline 0. But as described below, this round-robin schedule is modified in some cases to allow certain pipelines to be designated as higher or lower priority for execution.

In 306 it is determined if a "thread end" (TEND) command has been received, indicating the current active pipeline has completed its processing task. If current active pipeline thread execution ends, then in 308 execution will switch to another enabled pipeline.

If a TEND command is not received in 306, then in 310 the "thread interrupt enable" (TIE) status for the current active pipeline is determined. In one case the TIE status is set using a TIE bit in the pipeline register (e.g., R10 in FIG. 5) associated with each enabled pipeline. If thread interrupt is enabled for the current active pipeline, then execution of the current active pipeline is halted and a context switch occurs (unless, in one instance, thread interrupt is enabled for all other enabled pipelines, in which case execution continues for the current active pipeline).

In 312 it is determined if a DMA stall has occurred. If such a stall has not occurred in the current active pipeline, then current active pipeline execution continues in 304. If a DMA stall has occurred, then in 314 the "context switch disable" (CSD) status for the current active pipeline is determined. In one case the CSD status is set using a CSD bit in a pipeline register (e.g., R10 in FIG. 5) associated with each enabled pipeline. If context switching is disabled, then the current pipeline remains active, even though stalled, until processing resumes or a reset occurs. If context switching has not been disabled for the currently active pipeline, then context switching is allowed and the process moves to 308.

Thus the TIE and CSD features are used to set three pipeline execution priorities. The TIE feature allows a pipeline to be designated as low priority. This low priority pipeline operates in the background without blocking other processing requests received by the microprocessor. Routine priority pipelines have neither the TIE nor CSD features set. Setting the CSD for a particular pipeline designates the pipeline, once it begins executing, as a high priority pipeline to be executed ahead of all other pipelines, either pending or enabled during execution. That is, if CSD is set in a newly enabled pipeline, the currently active pipeline continues executing until a context switch occurs and the enabled pipeline with CSD set becomes the active pipeline. Other pipeline priority schemes may be used.

Figure 4:
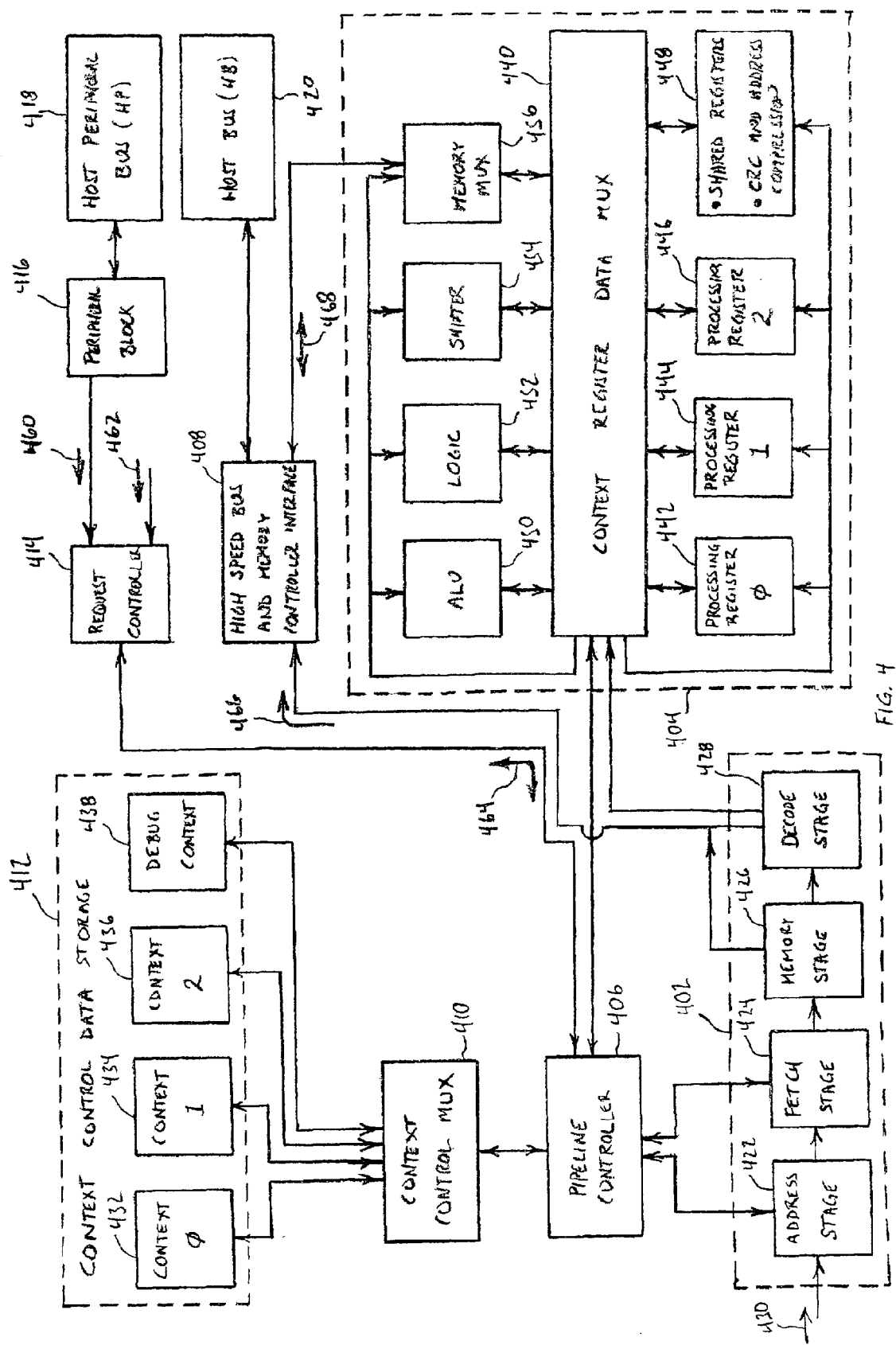
FIG. 4 is a diagrammatic view of a second context switching processor embodiment.

FIG. 4 is a diagrammatic view of functional blocks in a second context switching processor embodiment. Shared pipeline instruction datapath 402 is coupled to shared pipeline execution unit 404, to pipeline controller 406, and to high speed bus and memory controller interface 408. Shared execution unit 404 is also coupled to pipeline controller 406 and high speed bus and memory controller interface 408. Pipeline controller 406 is coupled to context control multiplexer 410, which is coupled to context control data storage 412 (e.g., registers). Pipeline controller 406 is also coupled to request controller 414. Request controller 414 is coupled to peripheral block 416 which acts as a buffer to host peripheral bus 418. Block 416 includes a 32-bit register which receives a software request number and a flag bit signifying the need for a request to be generated. Once pipeline controller 406 accepts the request, execution unit 404 resets the flag bit, thereby notifying the request software that block 416 can accept another request. Host bus 420 is coupled to high speed bus and memory controller interface 408.

Shared pipeline instruction datapath 402 includes address stage 422, fetch stage 424, memory stage 426, and decode stage 428. Pipeline instructions 430 flow through stages 422, 424, 426, 428 during processing. Pipeline controller 406 is coupled to address and fetch stages 422, 424 and controls, for instance, the address and prefetch actions required to enable a pipeline before the pipeline is made active.

In 412, context control data for a first context are stored in context 0 registers 432, for a second context are stored in context 1 registers 434, and for a third context are stored in context 2 registers 436. In one case, the context control data for each context include the program counter, TIE status, and CSD status. Control data for a debug context are stored in registers 438. The data from registers 432, 434, 436, 438 are channeled to and from shared instruction datapath 402 and to shared processing unit 404 via multiplexer 410 and controller 406.

Control and data information from pipeline controller 406 and from decode stage 428 in datapath 402 is received by context register data multiplexer 440, and is subsequently distributed within processing unit 404. Pipeline processing registers 442, 444, 446 are coupled to multiplexer 440 and are dedicated to storing information required for processing pipelines 0, 1, and 2, respectively. In one case, registers 442, 444, 446 include the stack pointer, flags, and general purpose registers associated with pipelines 0, 1, and 2, respectively. Shared pipeline registers 448 are also coupled to multiplexer 440 and include, in one case, a command register and cyclic redundancy check (CRC) registers that are shared among pipelines 0, 1, and 2. Arithmetic logic unit (ALU) 450, logic unit 452, and shifter 454 are coupled to multiplexer 440 and provide conventional numeric, logical, and shift processing capability to execution unit 404. Memory multiplexer 456 is coupled between multiplexer 440 and high speed bus and memory controller interface 408, and directs information flowing between execution unit 404 and host bus 420.

During operation, software processing requests 460 from one or more peripherals (not shown) are received in request controller 414 via peripheral bus 418 and peripheral block 416. Request controller 414 also receives hardware processing requests 462. A received request is queued in request controller 414 which requests via handshaking 464 a vector fetch associated with the received request from pipeline controller 406. If controller 406 accepts the request it signals request controller 414 via handshaking 464 that the request has been accepted, whereupon controller 414 drops the received request from the request queue. To process the request, pipeline controller 406 subsequently assigns and enables a corresponding pipeline as described above. In one case the program counter, TIE status, and CSD status are loaded into the context register 432, 434, 436 that is associated with the newly enabled pipeline (e.g., into register 432 for pipeline 0, etc.). During processing of a particular pipeline, additional context information loaded into the processing register 442, 444, 446 that is associated with the active pipeline (e.g., into register 442 for pipeline 0), and into shared registers 448. In one case registers 442, 444, 446 each include the general purpose and pipeline registers associated with each pipeline, and registers 448 include stack pointer, command, and CRC registers. In some cases the command register is visible to all other on-chip processors (see e.g., the multiple processors shown in FIG. 6).

Shared processing unit 404 operates using a set of defined registers. FIG. 5 is a table illustrating one such internal register file definition. In this illustrative case, processing unit 404 has internal address space for 16 destination registers and 15 source registers, specified as registers R0–R15. Register destination addresses are generated from bits [23:20] in an instruction word (IW), and register source addresses are generated from bits [19:16] in the instruction word. Each register contains 32 data bits. As shown in FIG. 5, only registers R0–R7 can be used for register addressing, although in other cases other register definitions may be used.

In an illustrative implementation, each unique pipeline has its own eight general purpose registers R0–R7, thereby allowing each pipeline (each context) to run independently of the other pipelines (other contexts). Each unique pipeline also has its own associated pipeline register R10. The stack pointer R11 is shared as discussed above. Registers R12–R15 are shared among all pipelines. Referring to FIG. 4, for example, pipeline processing register 442 contains defined register R0–R7 and R10 information that is associated with pipeline 0. Likewise, processing register 444 contains defined register R0–R7 and R10 information for pipeline 1, and processing register 446 contains defined register R0–R7 and R10 information for pipeline 2. Shared register 448 contains defined register R11–R15 information, and register 448 is shared among pipeline 0, pipeline 1, and pipeline 2. In other implementation, each context has a dedicated register set. However, sharing registers allows a saving in chip area. For example, the CRC block is typically about ten percent of the processor area. But since the CRC block is large and typically isn't used during every processing operation, sharing the CRC block among three pipelines saves two-thirds of the chip area that would otherwise be required if a CRC block was associated with each unique pipeline.

When a context switch is accomplished, the previously active pipeline (e.g., pipeline 0) instructions are flushed as necessary from shared datapath 402 and execution unit 404. Then, context control data (e.g., program counter, stack pointer) for the newly active pipeline (e.g., pipeline 1) is channeled from storage 412 (e.g., from register 434 in the case of pipeline 1) to datapath 402 and to shared registers 448 so that the new context control data controls shared datapath 402 operation. If the newly active pipeline is just beginning to process under a new context, then only the program counter associated with the new pipeline is switched in—the other pipeline registers contain invalid information since the information was from a previously processed context (e.g., a context previously processed by pipeline 1). If the newly active pipeline has been active before under the same context (e.g., a previous stall triggered a context switch to another pipeline) then the context information stored in processing registers 442, 444, 446 is still valid (e.g., in register 444 for pipeline 1) and is accessed as the newly active pipeline (e.g., pipeline 1) starts to execute. As the active pipeline executes, address and control information 466 is routed from memory and decode stages 426, 428 to host bus 420 via high speed bus and memory controller interface 408. Memory data 468 is exchanged between memory multiplexer 456 in processing unit 404 and host bus 420 via interface 408. In one instance bus 420 is an AMBA (Advanced Multiprocessor Bus Architecture, by ARM Ltd.) on-chip bus equivalent.

Figure 6A:
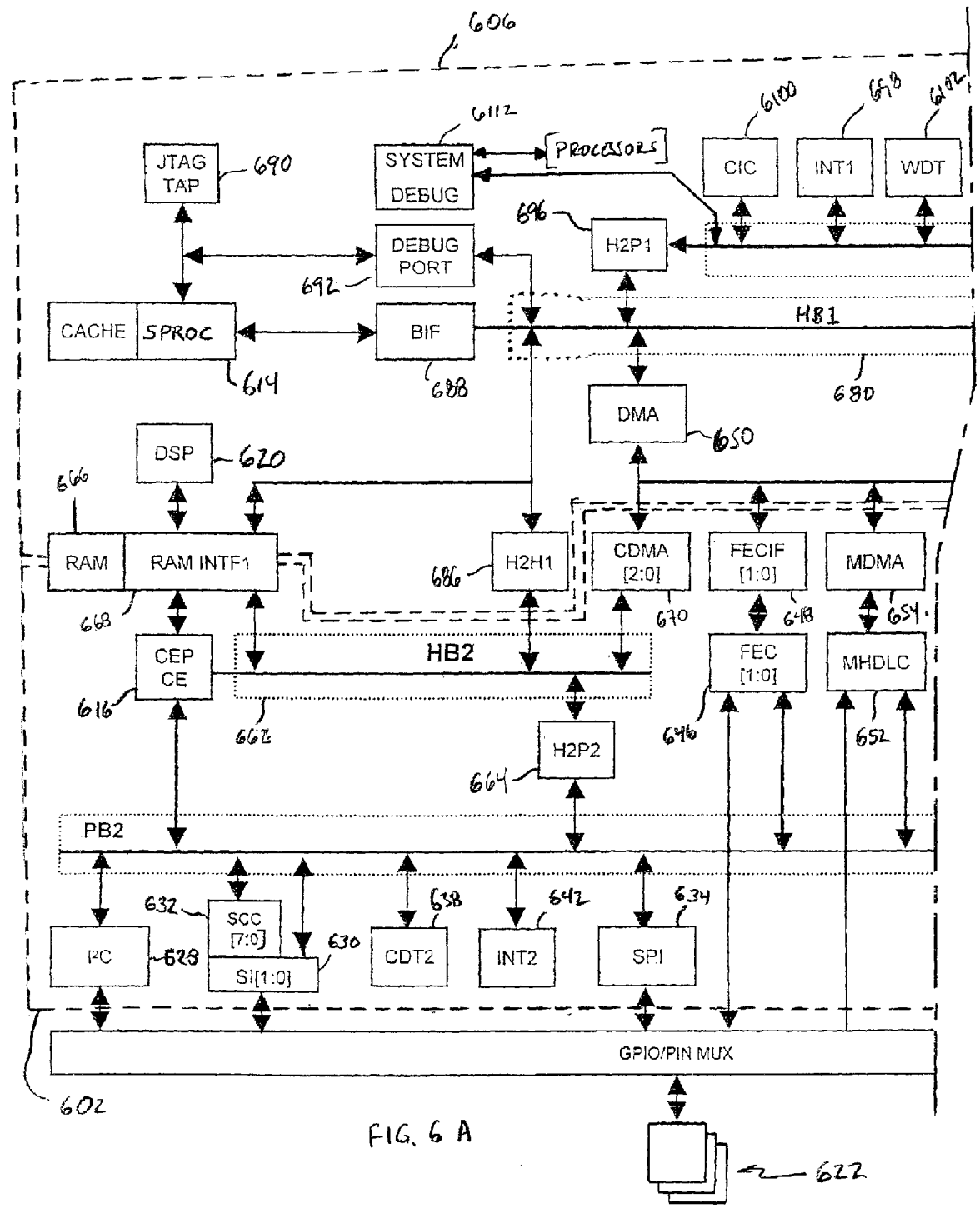

FIG. 6 is a diagrammatic view of a system-on-a-chip 600 that is used to process electronic communications. SOC 600 is partitioned into three main component groups: communication engine 602, asynchronous transfer mode (ATM) communication engine 604, and system block 606. SOC 600 also includes general purpose input/output (I/O)/pin multiplexer 608, I/O pad ring 610, and joint test action group (JTAG) I/O ring 612. The various busses depicted in FIG. 6 are shown surrounded by dotted lines to signify that these busses are not simple conductive line connections, but include bus logic of conventional design.

As shown in FIG. 6, SOC 600 includes four processors: system processor 614 (shown with its associated cache memory), communication engine processors 616, 618, and digital signal processor (DSP) 620. System processor 614 concentrates on system level tasks such as global packet routing, building tables showing packet location, source, and destination, and processing data to be sent from or received by SOC 600. The lower level processors 616, 618, 620 process data within SOC 600, generally moving the data through direct memory access. In one case processor 614 is an XTENSA processor by TENSILICA of Santa Clara, Calif. In one case, processors 616, 618 are 200 MHz 32-bit reduced instruction set computer (RISC) threaded processors providing shared pipelining and context switching as described above. Processor 620 is conventional in design.

Off-chip communication peripherals 622 are coupled to GPIO/PIN multiplexer 608. Data received from peripherals 622 are routed to peripheral bus 624 (peripheral busses shown in FIG. 6 are AMBA equivalents), associated with communications engine 616, and peripheral bus 626, associated with communications engine 618, via various interface units. In communication engine 602, one interface is Inter-IC ($I^2C$) bus 628. Serial interfaces 630 (the [1:0] signifying two interfaces 0 and 1, e.g., ISDN, T1, E1) and accompanying serial communications controllers 632 (the [7:0] signifying eight controllers 0–7) are also interface units. Another interface is small scale protocol interface (SPI) 634. Yet another interface is asynchronous transfer mode (ATM) Utopia interface unit 636. Interface units 628, 630, 632, 634 are coupled to peripheral bus 624 and data associated with these interface units are processed by communications engine 616. Interface unit 636 is coupled to peripheral bus 626 and data associated with this interface unit are processed by communication engine 618. As shown in FIG. 6, communication engine 618 handles only ATM-related data. Interface units 628, 630, 632, 634, 636 are illustrative and other units providing interface capability to various communications peripherals may be used.

Counter/timer 638 is coupled to peripheral bus 624 and provides general event timing function to processor 616. Counter/timer 640 is coupled to bus 626 and provides a similar event timing function to processor 618. In some cases timers 638, 640 may provide timing information to system processor 614.

Slave interrupt controller 642 acts as the primary interrupt controller for communication engine 602. Likewise, slave interrupt controller 644 acts as the primary interrupt controller for communication engine 604. Interrupt controllers 642, 644 are coupled to a command interrupt controller, which is described below.

Some peripherals 622 are provided DMA capability through communications engine 602. Fast Ethernet controllers 646 and their associate interfaces 648 (the [1:0] signifying two controllers and interfaces) are coupled to pass Ethernet information between multiplexer 608 and DMA controller 650. Fast Ethernet controllers 646 are also coupled to peripheral bus 624. Multi-channel High-level Data Link Controller (MHDLC) 652 (e.g., 128 HDLC channels) and its associated multichannel DMA 654 are coupled to pass information from multiplexer 608 to DMA controller 650, and also to pass information between bus 624 and DMA controller 650. An internal DMA (IDMA) unit 656 (the [2:0] signifying three subunits corresponding to each of three context-switchable pipelines), which provides general DMA capability, is also coupled to pass information between DMA controller 650 and mux 608, and between controller 650 and bus 624.

In ATM engine 604, ATM peripherals 622 are coupled to peripheral bus 626 and to host bus 658 via Utopia interface unit 636, which is conventional in design. Busses 626 and 658 are coupled via host-to-peripheral bridge 660.

Communication engine processor 616 is coupled to peripheral bus 624 and to host bus 662 (e.g., AMBA equivalent). Busses 624 and 662 are coupled by host-to-peripheral bridge 664. Processor 616 is coupled to random access memory (RAM) 666 via interface 668. The lines partitioning communication engine 602 and system block 606 are shown running through RAM 666 because RAM 666 serves both processors 616 and 620. (as well as other SOC 600 components, if necessary, as is depicted by the various interconnections shown in FIG. 6). RAM 666 is also coupled to host bus 662 via interface 668. Direct memory access for processor 616 is provided via communication engine DMA unit 670 (the [2:0] signifying three CDMA subunits, with each subunit being associated with one of three shared context-switchable pipelines as described above).

ATM communication engine processor 618 is coupled to peripheral bus 626 and to host bus 658 (e.g., AMBA equivalent). Processor 618 is also coupled to RAM 672 via RAM interface 674. The lines partitioning ATM communication engine 604 and system block 606 are shown running through RAM 672 because RAM 672 serves both engine 604 and block 606 components. Direct memory access for processor 618 is provided via segmentation and reassembly (SAR) DMA (SDMA) unit 676 (the [2:0] signifying three SDMA subunits, with each subunit being associated with one of three shared context-switchable pipelines as described above).

In system block 606, host bus 680 (e.g., AMBA equivalent) provides a centralized information routing capability to various SOC 600 components. Host bus 680 is coupled to off-chip main memory 682 via memory controller 684 (in other cases using, for example, wafer-scale integration, at least a portion of the main memory may be on the same chip/substrate as SOC 600). Host bus 680 is coupled to host bus 662 via host-to-host bridge 686, and to host bus 658 via host-to-host bridge 688. Bus 680 is coupled to RAMs 666, 672 via RAM interfaces 668, 674, respectively. Host bus 680 is coupled to system processor 614 via bus interface 688. Host bus 680 is coupled to JTAG test access port (TAP) 690 via debug port 692. Finally, host bus 680 is coupled to peripheral bus 694 via host-to-peripheral bridge 696.

As shown in FIG. 6, various components are coupled to peripheral bus 694. Slave interrupt controller 698 is coupled to bus 694 and is similar to controllers 642 and 644, providing primary interrupt control for system block 606. Central interrupt controller (CIC) 6100 is coupled to bus 694 and to slave controllers 642, 644, 698 and acts as an interrupt controller for system processor 614. CIC 6100 also acts as an interrupt arbitrator that sets priorities for each of the slave controllers (e.g., the interrupt controllers are arranged in a tree structure) due to the large number of peripherals. Watch dog timer 6102 provides watch dog timing capability to SOC 600. Counter/timer 6104 provides an event timing function for system block 606. Real time clock 6106 provides a real time clock input to SOC 600. Clocking power-on reset (CPR) unit 6108 provides a power-on reset circuit for SOC 600. CPR 6108 also provides a clocking control circuit that allows various portions of SOC 600 to be turned off by turning off the respective portion's clock. In addition, CPR 6108 provides the capability to shift timing reference between an off-chip crystal (not shown) and phase lock loop 6110.

System debug unit 6112 is coupled to peripheral bus 694 and to each of the four SOC 600 processors 614, 616, 618, 620 (the coupling routes are omitted for clarity) and provides debug capability for SOC 600. Each of the four processors generates two break types if a processing fault is encountered: a local break which stops the processor generating the break, and a global break which stops all processors. The debugger provides the capability to generate such breaks, and also provides status information regarding which processor has generated breaks. The debugger further allows either system processor 614 or an off-chip processor to act as the host for debugging.

Referring to FIG. 4, the debug pipeline context is limited and in one instance provides only a program counter, a flag register, and its own stack and stack pointer. In debug mode, processing unit 404 executes under one of the non-debug contexts so that debug code is run without disturbing the other context or processing registers. For example, to determine pipeline status, the debugger steps through the pipeline register for each unique context to determine which pipeline is designated enabled or active, and what the program counter value is for each pipeline. Thus information for the contexts being processed is not disturbed, either by temporarily imaging the information to another location while the debugger operates, or destroying the information outright. In accordance with one aspect of the invention, the debugger overrides control (including switching) of context processing without disturbing the actual processing.

Test data for SOC 600 is exchanged via JTAG TAP 690. Received test inputs are routed from port 690 directly to system processor 614 or to host bus 680. Test results are output to port 690 directly from system processor 614 or from host bus 680.

Information passing between integrated circuit 602 and other devices outside integrated circuit 602 is via conventional input/output pad ring 610, the connections to which are omitted for clarity. Likewise, conventional connections to JTAG input/output ring 612 are not shown.

As a brief illustration of SOC 600 operation, in some instances communication engine processor 616 moves communication data within SOC 600, and in some instances processor 616 only provides information that facilitates information movement within SOC 600. For instance, if an SCC 632 informs communication engine processor 616 that the SCC requires data, processor 616 examines data tables generated by system processor 614 to locate the required data and then fetches the required data via CDMA 670. Processor 614 then performs any required processing (e.g., CRC) and then passes the requested data to SCC 632. If SCC 632 signals processor 614 that SCC 632 has data to be received, then processor 614 reads the data from SCC 632 and passes the read data to memory via CDMA 670. In another instance, data passing at a high rate is routed, for example, directly through FEC 646 or MHDLC 652 to DMA 650 with processor 614 providing only an address and byte count for the information being passed. When processing is required, processor 614 assigns pipelines and performs context switching as described above when, for example, DMA controller 650 signals that a DMA stall has occurred.

Skilled persons will understand that although the invention has been described in terms of specific embodiments, many variations exist. Accordingly, the scope of the invention is defined by the following claims.

We claim:

1. A computer processing method comprising the acts of:
    using a shared pipeline instruction datapath and a shared pipeline processing unit to execute a first pipeline under a first context;
    receiving a request to execute under a second context and, in response to the request, enabling a second pipeline to execute under the second context, wherein the enabling occurs during execution of the first pipeline, the enabling including suspending execution of the first pipeline for a clock cycle and using the clock cycle to fetch an address vector associated with the second context;
    detecting a halt in execution of the first pipeline; and
    using the shared datapath and shared processing unit to execute the second pipeline after detecting the halt.

2. The method of claim 1, wherein the halt is a first pipeline thread end.

3. The method of claim 1, wherein the halt is a direct memory access stall.

4. The method of claim 1, wherein the halt is due to the second context being assigned a higher priority than the first context.

5. The method of claim 1, wherein executing the second pipeline comprises flushing instructions associated with the first context from registers of the shared instruction datapath.

6. The method of claim 1, wherein executing the second pipeline comprises flushing instructions associated with the first context from registers of the shared processing unit.

7. The method of claim 1, wherein executing the second pipeline occurs only if a first pipeline status allows context switching.

8. The computer processing method of claim 7, wherein the first pipeline status does not allow context switching where a context switch disable bit is set, the context switch disable bit being dynamically configurable during thread operation.

9. The method of claim 1 further comprising the acts of:
    detecting a halt in execution of the second pipeline; and
    using the shared instruction datapath and the shared processing unit to resume execution of the first context subsequent to detecting the halt in execution of the second context.

10. The method of claim 1 further comprising the act of executing a debug context without disturbing execution of the first or second pipelines.

11. A context switching microprocessor comprising:
    a shared pipeline instruction datapath; comprising a pipeline address stage, a pipeline fetch stage, a pipeline memory stage, and a pipeline decode stage;
    a shared pipeline processing unit;
    a first set of pipeline registers associated with a first pipeline;
    a second set of pipeline registers associated with a second pipeline;
    a control multiplexer coupling the first set of pipeline registers to the shared datapath and to the shared processing unit, and coupling the second set of pipeline registers to the shared datapath and to the shared processing unit; and
    a set of shared registers associated with both the first pipeline and the second pipeline.

12. The microprocessor of claim 11 further comprising a pipeline controller coupled to the control multiplexer and to the shared instruction datapath.

13. The microprocessor of claim 11, wherein the shared processing unit comprises a pipeline execution stage.

14. The microprocessor of claim 11 further comprising a memory controller coupled to the shared instruction data path and to the shared processing unit.

15. A context switching microprocessor comprising:
    a shared instruction datapath;
    a shared processing unit comprising a first set of processing registers associated with executing a first context pipeline, a second set of processing registers associated with executing a second context pipeline, and a set of shared registers associated with executing both the first and the second context pipelines, the shared processing unit being coupled to the shared instruction datapath; and
    a context control data storage comprising a first context register associated with executing the first context pipeline and a second context register associated with executing the second context pipeline, the context control data storage being coupled to the shared instruction datapath and to the shared processing unit.

16. The microprocessor of claim 15, wherein the shared instruction datapath comprises a pipeline address stage, a pipeline fetch stage, a pipeline memory stage, and a pipeline decode stage.

17. The microprocessor of claim 15, wherein the first context register comprises a first program counter register associated with the first pipeline context and the second context register comprises a second program counter register associated with the second pipeline context.

18. The microprocessor of claim 15, wherein the shared registers comprise at least one register associated with cyclic redundancy checking.

19. The microprocessor of claim 15, wherein the context control data storage comprises a register associated with executing a debug context.

20. The microprocessor of claim 15 further comprising a pipeline controller coupled between the context control data storage and the shared instruction datapath, and coupled between the context control data storage and the shared processing unit.

21. The microprocessor of claim 20 further comprising a request controller coupled to the pipeline controller.

22. A communication processing system comprising:
- a communication engine comprising a pipeline context switching microprocessor, the context switching microprocessor comprising:
  - a shared instruction datapath;
  - a shared processing unit comprising a first set of processing registers associated with executing a first context pipeline, a second set of processing registers associated with executing a second context pipeline, and a set of shared registers associated with executing both the first and the second context pipelines, the shared processing unit being coupled to the shared instruction datapath; and
  - a context control data storage comprising a first context register associated with executing the first context pipeline and a second context register associated with executing the second context pipeline, the context control data storage being coupled to the shared instruction datapath and to the shared processing unit; and
- a system block comprising a system microprocessor coupled to the communication engine.

23. The system of claim 22, wherein the system is formed as a single integrated circuit.

24. The system of claim 22, wherein the context switching microprocessor further comprises:
- a control multiplexer coupling the first set of processing registers to the shared datapath, and coupling the second set of processing registers to the shared datapath and to the shared processing unit.

25. A computer processing method comprising the acts of:
- using a shared pipeline instruction datapath and a shared pipeline processing unit to execute a first pipeline under a first context;
- receiving a request to execute under a second context and, in response to the request, enabling a second pipeline to execute under the second context, wherein the enabling occurs during execution of the first pipeline, the enabling including fetching an address vector associated with the second context;
- detecting a halt in execution of the first pipeline; and
- using the shared datapath and shared processing unit to execute the second pipeline after detecting the halt;
- wherein a second pipeline status allows context switching with any pipeline that does not have the second pipeline status, the second pipeline status being dynamically configurable during thread operation.

* * * * *